United States Patent [19]

Neale

[11] Patent Number: 4,535,801
[45] Date of Patent: Aug. 20, 1985

[54] MULTI-PURGE GATE VALVE FOR PARTICULATE SOLIDS FLOW

[75] Inventor: Thomas J. Neale, Parsippany, N.J.

[73] Assignee: Foster Wheeler Energy Corporation, Livingston, N.J.

[21] Appl. No.: 482,809

[22] Filed: Apr. 7, 1983

[51] Int. Cl.³ .......................... B08B 3/04; B08B 9/00
[52] U.S. Cl. .................................... 137/240; 137/334; 137/375; 134/166 C; 222/148; 251/327; 251/328; 251/329; 406/192
[58] Field of Search ............... 137/238, 240, 375, 334; 222/148; 134/166 C, 169 C, 169 R; 251/326, 327, 328, 329, 58; 406/192

[56] References Cited

U.S. PATENT DOCUMENTS

| | | | |
|---|---|---|---|
| 691,975 | 1/1902 | Schaaf | 137/240 |
| 870,487 | 11/1907 | Bertram | 137/240 |
| 1,995,727 | 3/1935 | Wetherbee | 137/375 |
| 2,305,724 | 12/1942 | Luetzelschwab | 137/240 |
| 2,630,293 | 3/1953 | Smith | 137/240 |
| 2,631,759 | 3/1953 | Hoopes | 137/240 |
| 2,705,016 | 3/1955 | Saar | 137/240 |
| 3,150,680 | 9/1964 | Becker et al. | 137/375 |
| 3,334,653 | 8/1967 | Works et al. | 251/328 |
| 3,547,140 | 12/1970 | Hastings et al. | 137/240 |
| 4,026,324 | 5/1977 | King et al. | 137/238 |

Primary Examiner—George L. Walton
Attorney, Agent, or Firm—Marvin A. Naigur; John E. Wilson; Martin Smolowitz

[57] ABSTRACT

A gate valve assembly for controlling flow of fine particulate solids, utilizing dual seating surfaces and a slidable gate which are either or both purged by an outflowing gas. The valve body is constructed in two split parts, and the body seat surface contains a conduit spaced outwardly from the seat and having a plurality of spaced openings oriented radially inwardly. The gate contains multiple passageways and is connected to a stem adapted for supplying a flow of pressurized purge gas to the passageways arranged to prevent deposits of the particulate solids passing therethrough on the valve seating surfaces. The valve is usually used for high temperature service, e.g. at 300°–1000° F., the valve body and gate are cooled by a vent gas, and the valve body is covered with thermal insulation material. The valve assembly is usually located within the lower end of an insulated container and controls the flow of particulate solids from the container.

15 Claims, 4 Drawing Figures

MULTI-PURGE GATE VALVE FOR PARTICULATE SOLIDS FLOW

BACKGROUND OF INVENTION

This invention pertains to a purged gate valve suitable for controlling the flow of particulate solids. It pertains more particularly to a gate valve assembly having multiple gas purge passages associated with the seat and gate for preventing deposits of particulate solids and facilitating their flow through the valve.

There is a growing need in industry for handling powdered materials, such as powdered coal feed to steam boilers or coal and lime to coal gasifiers, and for suitable valve devices for reliably controlling the flow of such solids even when the solids are at high temperature. Because the pressure of such fine solids usually exceeds atmospheric, the finely divided material usually causes problems of clogging or even plugging valve flow passages and thus interfering with reliable valve operation. Several valve designs have been developed for handling such particulate solids, for example, as disclosed in U.S. Pat. No. 3,006,357 to Woerner; U.S. Pat. No. 3,547,140 to Hastings et al.; U.S. Pat. No. 3,918,471 to Bedner; and U.S. Pat. No. 4,070,161 to Harter. Although considerable efforts have been made to solve these problems in handling particulate solids using valves of various designs, none of the known prior art designs have been found to be entirely satisfactory for handling the flow of such fine particulate solids.

SUMMARY OF INVENTION

The present invention provides a purged gate valve assembly for controlling the flow of particulate solids therethrough, and has provision for passing a gas through a plurality of flow passages associated with the valve seat and/or the gate member. The valve comprises an elongated body having a transverse opening therethrough near one end and packing means at the opposite end, said body containing a centrally-located groove located transverse to said opening and having dual adjacent inner seating surfaces; a conduit retained in said groove in the valve body member and located outwardly from and between the valve seating surfaces, with the conduit having a plurality of spaced openings oriented radially inwardly for inward flow of a pressurized purging gas through the openings to purge the valve seat surfaces; and a gate member longitudinally movable within said valve body which mates against the seating surfaces. The gate has an internal cavity and multiple flow passages from the cavity and usually located in a circular pattern around the seating surface of the gate. The gate is threadably connected to a stem for moving the gate longitudinally in the valve body, and the stem has a passageway for passing a purge gas through the flow passages in the gate. A purge gas is passed through the openings between the seat surfaces, and/or passed through the internal cavity and multiple passageways in the gate member for purging the mating seating surfaces to prevent deposits of particulate solids in the valve body and on the seating surfaces.

It is an advantage of the present gate valve assembly that the mating seating surfaces can be kept clear of deposits of particulate solids by passing a suitable purge gas such as a process gas through the openings in either or both in the body between the seating surfaces and in the movable gate member.

DESCRIPTION OF INVENTION

Figure 1:
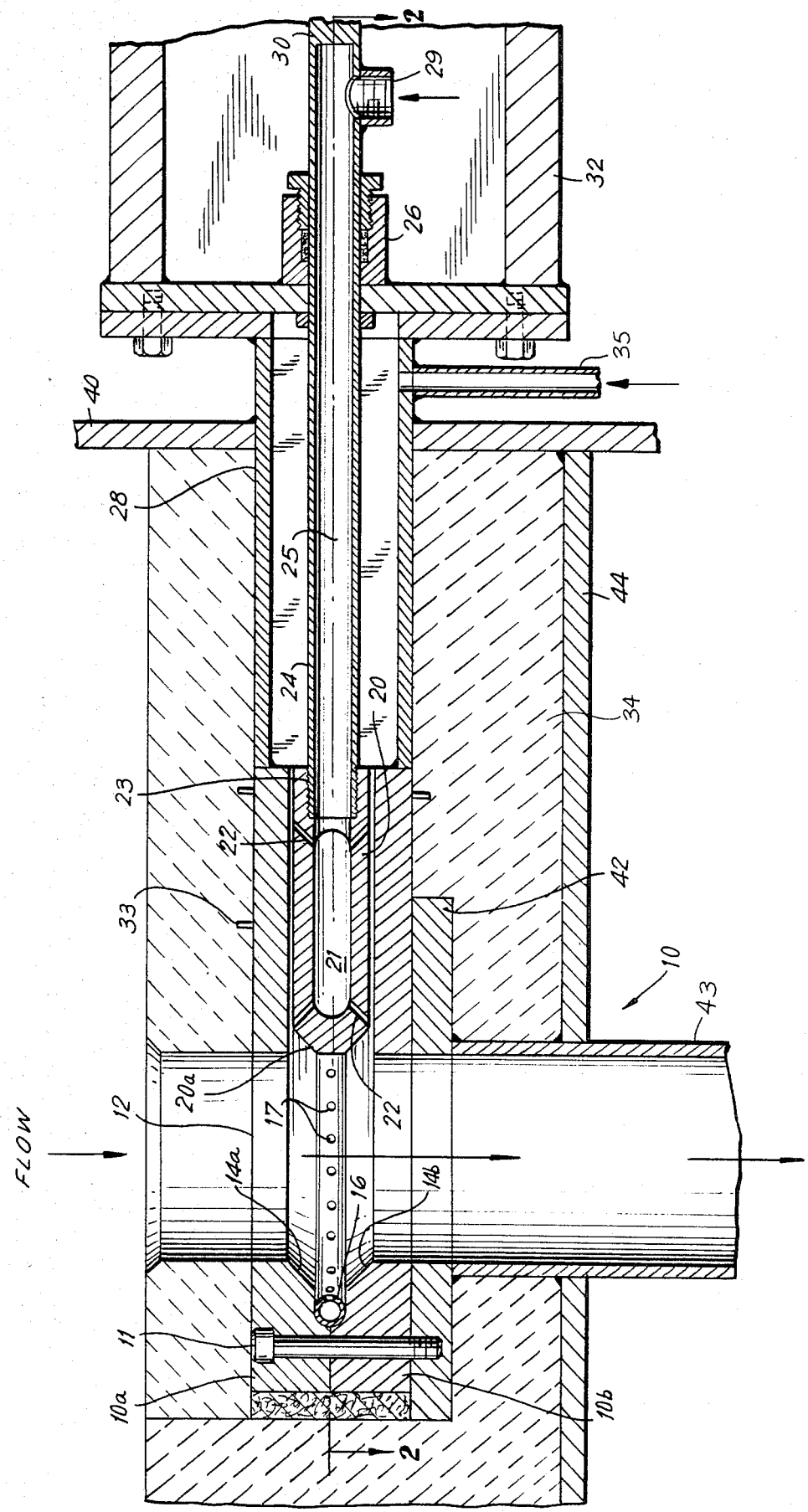
FIG. 1 is a cross-sectional view of the gate valve assembly in accordance with the present invention, with the gate being shown in an open position.
Figure 2:
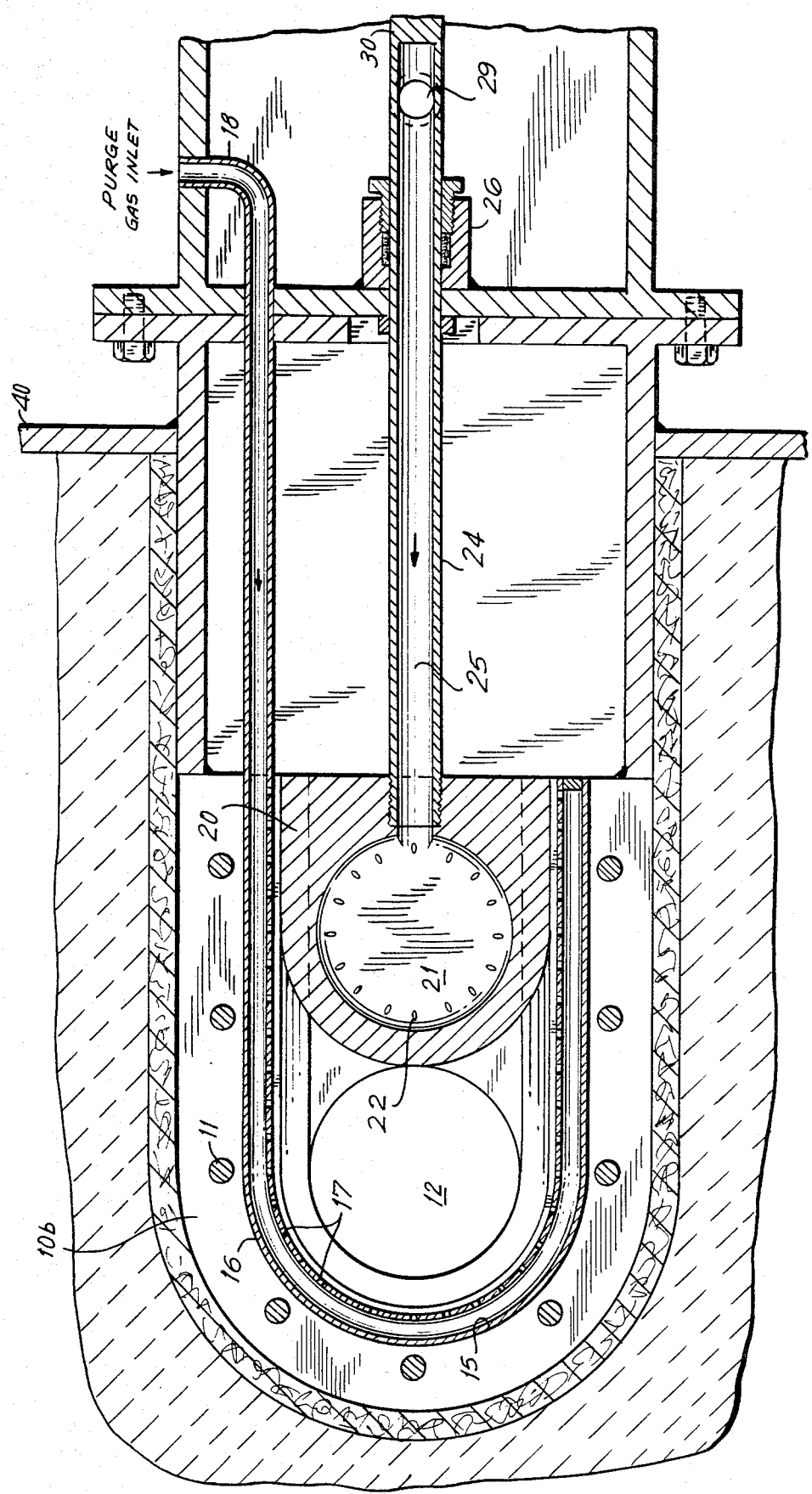
FIG. 2 shows a view of the valve assembly taken along section 2—2 of FIG. 1.

The invention will now be described in greater detail with reference first to FIG. 1, which generally shows a valve body 10 which for convenient manufacture can be split into two usually equal parts 10a and 10b, and which are fastened together by suitable bolts 11. The body parts each have openings 12 and beveled seat surfaces 14a and 14b, which are circular-shaped for receiving a mating closure gate member. A conduit 16 having a plurality of uniformly spaced openings 17 is provided in groove 15 in the valve body and is located outwardly from and between the seating surfaces 14a and 14b. As shown in FIG. 2, a gas source is provided either continuously or intermittently to inlet end 18 of conduit 16 and is passed through the multiple spaced openings 17, so as to fluidize and remove any solids which may accumulate on the valve seat surfaces 14a and 14b.

Figure 3:
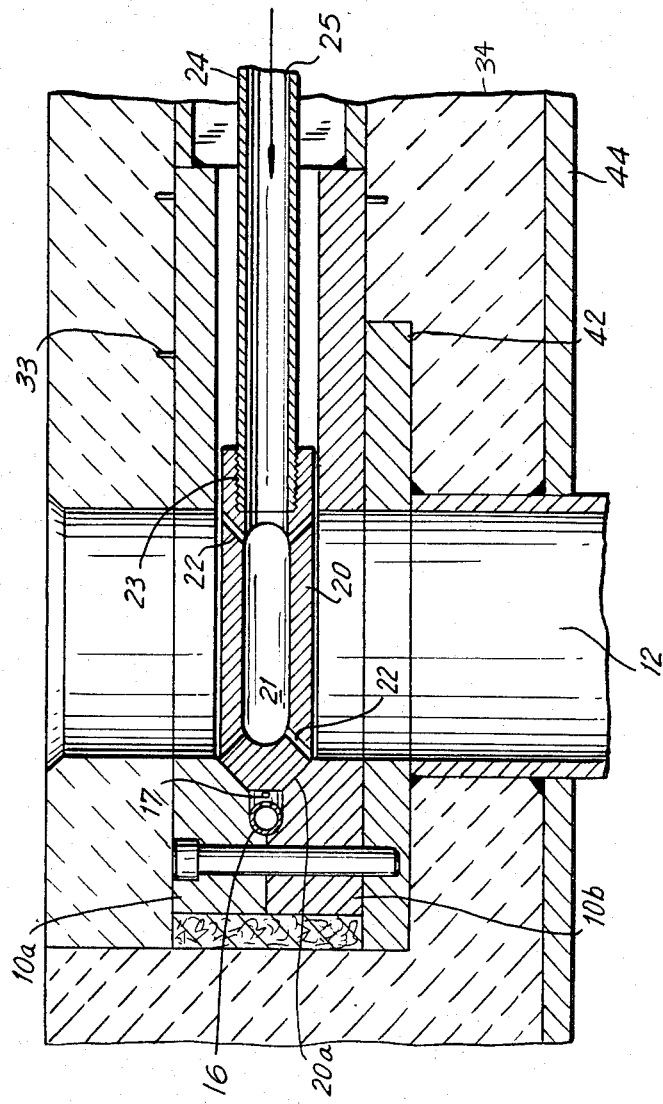
FIG. 3 is a partial cross-sectional view showing the gate closed onto the body seating surface.
Figure 4:
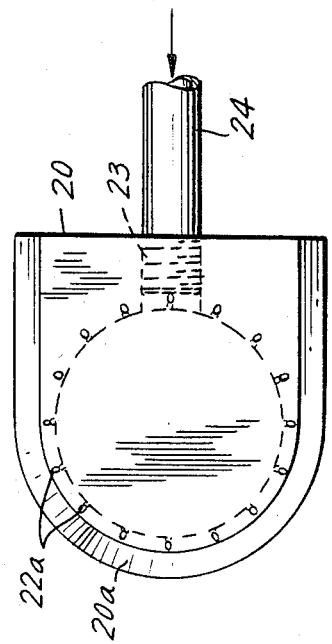
FIG. 4 is a view showing the gate with internal cavity and multiple flow passages.

A valve gate 20, which is longitudinally movable in the valve body 10 and has its inner end circular in shape and has bevel surfaces 20a so as to fit into the valve seating surfaces, is provided in body 10, as is shown in FIGS. 2 and 3. The gate 20 preferably has an inner cavity 21 connected to multiple passages 22, which have their outlet ends 22a located in a generally circular pattern and adjacent to seating surfaces 14a and 14b, as shown in FIG. 4. The gate 20 is connected preferably by a threaded joint 23 to a valve stem 24, which serves to move gate member 20 longitudinally against and away from mating contact with valve seat 14. Valve stem 24 passes though a packing gland 26 located at the outer end of valve body extension 28. Stem 24 also contains an internal passage 25 to provide flow of a pressurized purge gas through the passage to cavity 21 and then outwardly through multiple passages 22 adjacent the gate seating surfaces 14a and 14b. Flow of a purge gas through passages 22 prevents or removes any accumulation of particulate solids in the seat portion of the valve. The purge gas such as air, steam, or a process gas, is provided to passageway 25 at connection 29, usually by a suitable flexible hose (not shown).

The valve gate 20 and attached stem 24 are longitudinally operated within body 10 by any suitable operator means, such as pneumatic piston 30 which is preferably separated from the valve body 10 by an extension structure 32.

The valve assembly can be used over a wide range of temperatures, and is preferably used fo high temperature service such as at 300°–1000° F. The valve materials of construction are selected to be suitable for such temperature, and are preferably constructed of stainless steel alloys. When the valve assembly is made suitable for high temperature service, a thermal insulation material 34 such as refractory insulation is provided on the external surfaces of the valve body. Such refractory insulation material is usually retained to the valve body 10 by suitable anchor projections 33.

The valve assembly can be used in any position, and is preferably used for controlling the flow of hot particulate solids to or from a container 40, such as a coal gasifier vessel. As shown by FIGS. 1 and 3, valve body can be rigidly attached to a support by bolts 11 flange 42 and conduit 43, which are located near a lower wall 44 of vessel the 40.

Although the invention has been described broadly and in terms of a preferred embodiment, it is understood that various modification and variation can be made and that some features can be employed without others, all within the spirit and scope of the invention which is defined by the following claims.

I claim:

1. A gate valve assembly for controlling the flow of fine particulate solids therethrough, comprising:
   (a) an elongated valve body having a transverse opening therethrough near one end and packing means provided at the opposite end, said body containing a centrally-located groove located transverse to said opening and having dual adjacent inner seating surfaces;
   (b) a conduit retained in said groove in the valve body, said conduit having a plurality of spaced openings oriented radially inwardly and arranged for inward flow of a pressurized purging gas through the openings to purge the gate valve assembly seating surfaces;
   (c) a gate member longitudinally movable within said body, said gate being aligned within said groove and mating with said seating surfaces, said conduit surrounding said seating surfaces and said gate member for purging said seating surfaces, and
   (d) a valve stem rigidly connected to said gate member and extending through said packing means, for moving the gate longitudinally within said body to open and close said transverse opening in the valve body.

2. The valve assembly of claim 1, wherein said valve body is constructed in two parts split along the valve longitudinal centerline, said body parts being connected together by suitable bolting means.

3. The valve assembly of claim 1, wherein said valve body has dual beveled seating surfaces, with said conduit being located outwardly from and between the beveled seating surfaces in the valve body.

4. The valve assembly of claim 1, wherein said valve body and stem are elongated so as to separate an operator means from the valve body.

5. The valve assembly of claim 4, wherein said valve gate and stem unit are moved longitudinally by pneumatic piston operator means.

6. The valve assembly of claim 1, wherein said valve body is cooled by gas flow from a connection adjacent said packing means.

7. The valve assembly of claim 1, wherein said valve is adapted for high temperature service and is covered with a thermal insulation material.

8. The valve assembly of claim 1, wherein said valve body is positioned horizontally at the lower end of a thermally insulated container, so that particulate solids are withdrawn intermittently from the container through the valve.

9. The valve assembly of claim 1, wherein said gate member has an internal cavity and multiple flow passages extending outwardly from said cavity for outward flow of a purge gas from said cavity through the passages, and said stem contains a passageway for providing a purge gas to the gate member cavity and flow passages, whereby gas flows through the valve stem passageway to said gate member cavity and outwardly through said passages so as to purge the mating surfaces and present deposits of particulate solids on the valve seating surfaces.

10. The valve assembly of claim 9, wherein separate gas sources are provided for outward flow of gas through said conduit openings in said valve seat and through said adjacent passages in said gate member.

11. A gate valve assembly for controlling the flow of fine particulate solids therethrough, comprising:
    (a) an elongated valve body having a transverse opening therethrough near one end and packing means provided at the opposite end, said body containing a centrally-located groove having beveled inner seating surfaces;
    (b) a gate member longitudinally movable within said body, said gate being aligned within said groove and mating with said seating surfaces, said gate member having an internal cavity and multiple flow passages annularly surrounding said cavity and oriented downwardly from said cavity for flow of a purge gas through the passages, said flow passages being surrounded by said seating surfaces; and
    (c) a valve stem rigidly connected to said gate member and extending through said packing means for moving the gate longitudinally within said body, said stem containing a passageway for providing a purge gas to the gate member cavity and flow passages, whereby gas flows through the valve stem passageway to said cavity in said gate and outwardly through said passages so as to purge the mating surfaces and prevent deposit of particulate solids on the valve seating surfaces.

12. The valve assembly of claim 11, wherein said valve body and stem are elongated to separate an operator means from the valve body, and the valve body is cooled by gas vent flow source provided adjacent said packing means.

13. The valve assembly of claim 11, wherein said valve body is adapted for high temperature service and is covered with a thermal insulation material.

14. The valve assembly of claim 11, wherein said valve body is positioned horizontally at the lower end of a thermally insulated container, so that particulate solids are withdrawn intermittently from the container through the valve.

15. A gate valve assembly for controlling the flow of fine particulate solids therethrough, comprising:
    (a) an elongated valve body constructed in two mating parts and having a transverse opening therethrough near one end and packing means located at the opposite end, said body containing a centrally-located groove at the opposite end, said groove having dual beveled inner seating surfaces;
    (b) a conduit retained in said groove in the valve body, said conduit having a plurality of spaced openings oriented radially inwardly and arranged for inward flow of a pressurized purge gas through the openings to purge the gate valve assembly seating surfaces;
    (c) a gate member longitudinally movable within said body, said gate being aligned within said groove and mating with said seating surfaces, said conduit surrounding said seating surfaces and said gate member for purging said seating surfaces, said gate member having an internal cavity and multiple flow passages extending outwardly from said cavity and directed toward the valve seat for outward flow of a purge gas from said cavity through the passages; and (d) a valve stem rigidly connected to said gate member and extending through said packing means from moving the gate longitudinally within the valve body, said stem containing a passageway for providing a purge gas to the gate member internal cavity and passages, whereby gas flows through the valve stem passageway to said gate member cavity and outwardly through said passages so as to purge the mating seating surfaces and prevent deposits of particulate solids on the valve seating surfaces.

* * * * *